United States Patent [19]

Jones

[11] 4,049,017
[45] Sept. 20, 1977

[54] ADJUSTABLE RELIEF VALVE

[75] Inventor: Evan Jones, Evanston, Ill.

[73] Assignee: Henry Valve Company, Melrose Park, Ill.

[21] Appl. No.: 675,975

[22] Filed: Apr. 12, 1976

[51] Int. Cl.² .............................................. F16K 15/02
[52] U.S. Cl. ................................ 137/540; 137/543.17; 251/337
[58] Field of Search ....................... 137/540, 543.17; 251/337

[56] References Cited

U.S. PATENT DOCUMENTS

| 2,254,209 | 9/1941 | Buttner et al. | 137/540 |
| 2,568,026 | 9/1951 | Pigott | 137/540 X |
| 2,642,892 | 6/1953 | Simons | 137/540 X |
| 3,025,874 | 3/1962 | Yocum | 137/540 |
| 3,105,517 | 10/1963 | Alfieri | 137/540 |
| 3,406,912 | 10/1968 | Claffey | 251/337 X |

FOREIGN PATENT DOCUMENTS 1,750,822  6/1968  Germany .......................... 137/540

Primary Examiner—William R. Cline
Attorney, Agent, or Firm—Lockwood, Dewey, Zickert & Alex

[57] ABSTRACT

An improved relief valve, particularly suited for interior use in refrigeration systems. The valve includes a valve body having an inlet, an outlet, and a passageway therebetween with a valve seat positioned in the passageway. Inside of the passageway are mounted an adjustable valve spring retainer, a coil valve spring, a valve piston including a fluorocarbon sealing surface thereon, and a bearing means mounted between one end of the valve spring and either the retainer or valve piston. The spring retainer is adjusted by turning in its threaded mounting. The bearing means prevents the turning moment applied to the retainer from extending to the valve piston. Any rotational relation between the piston sealing surface and seat which would be deleterious to the sealing engagement is eliminated.

2 Claims, 5 Drawing Figures

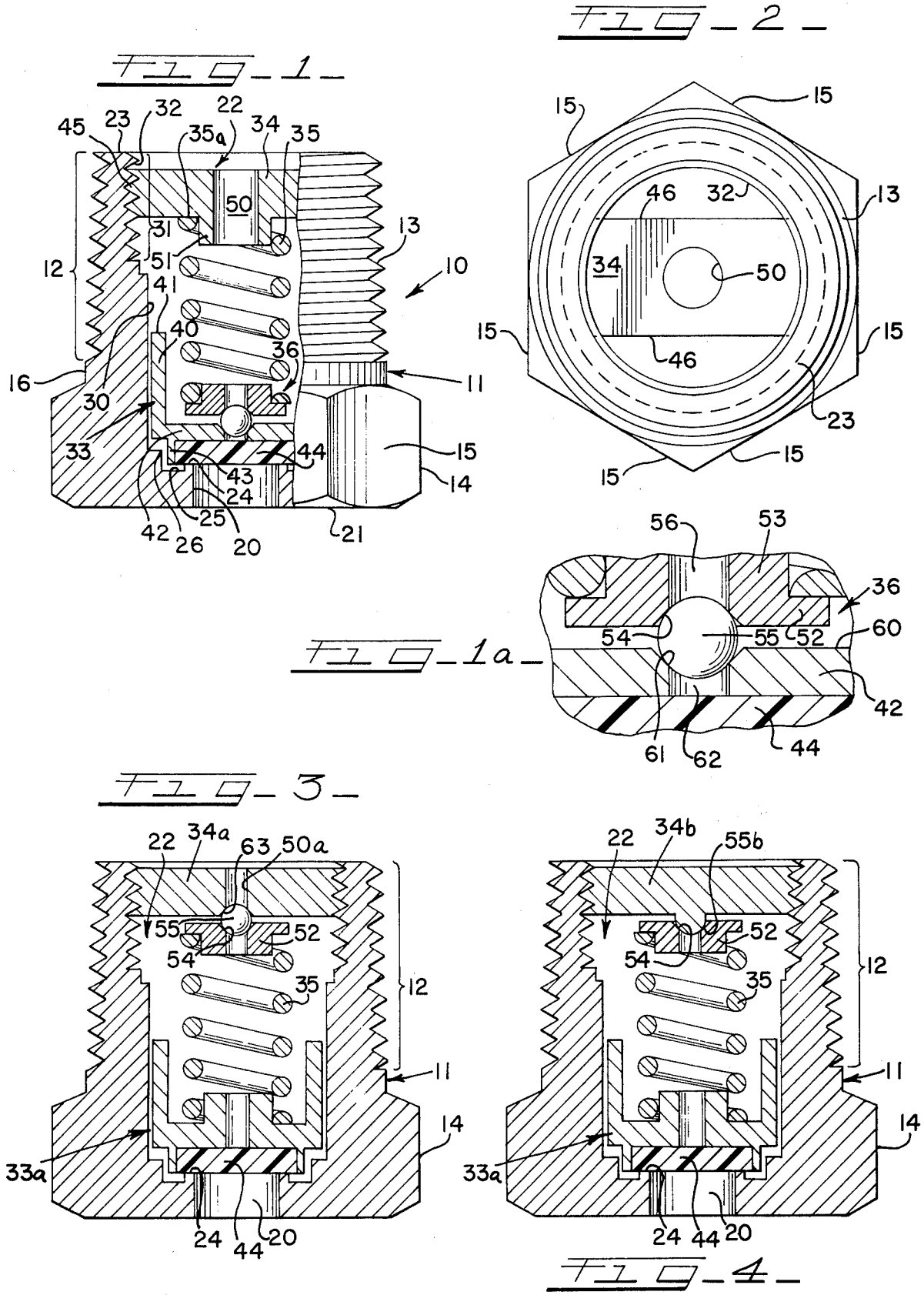

ADJUSTABLE RELIEF VALVE

BACKGROUND OF INVENTION

This invention relates to improvements in relief valves and more specifically to improving the adjustability of relief valves utilized in refrigeration systems while maintaining intact the sealing or seating engagement between the respective valve member and valve seat in the valve. Relief valves and especially those used in refrigeration systems are susceptible to special problems because of the cold or hot temperatures in which the relief valve may operate, depending on where in the refrigeration system this valve is positioned. Also, the use of modern synthetic materials, including a fluorocarbon resin commonly known under the trademark "Teflon" has become widespread at the sealing engagement of the valve because of its low coefficient of friction and good wear characteristics. An example of a relief valve including a fluorocarbon resin seal may be found in U.S. Pat. No. 3,425,444 issued Feb. 4, 1969 to the assignee of the present application.

Unlike synthetic rubber, used for seals in many relief valves for refrigeration service, Teflon is not a resilient material, and under relatively low compressive stress will not readily form a pressure-type seal against the valve seat. Although not resilient, Teflon will cold flow and when under compressive stress over a period, will eventually form a pressure-type seal.

Since individual relief valves may have differing characteristics, means are provided for setting or adjusting the initial leak pressure of the relief valve. Such adjustment means included a threaded gland member which abuts one end of a spring biasing the valve member containing the Teflon seal against a stationary valve seat in the valve body. By turning the threaded gland member, the spring is compressed or allowed to expand in order to adjust the force on the sealing engagement, i.e., the initial leak pressure, of the valve. Since the Teflon sealing member has a low coefficient of friction against its valve seat, frequently, while turning the adjustment gland, a moment was transmitted through the spring to the valve member causing the Teflon seal in the valve member to turn on the seat in the valve body. This destroyed the pressure-tight seal formed between the Teflon and the valve seat and caused the valve to leak at pressures well below the desired leak pressure. It was then necesssary to permit the valve to set long enough to allow the Teflon to cold flow against the seat to re-form a new pressure-tight seal. This procedure is setting Teflon seated relief valves was time-consuming and frequently resulted in an undesirably wide deviation from the originally designed initial leak pressure.

The prior art also discloses that bearing means, and, more specifically, ball bearing means have long been utilized in valves. In one type of valve, the ball valve, the valve member is in effect a large ball bearing which easily turns upon its valve seats. Fluid flow through the valve is accomplished by a hole positioned through the middle of the large ball bearing.

Ball bearings have been utilized in conventional globe valves in order to more evenly distribute the load from the stem through the ball to the seat disc. Such a globe valve is shown and described in U.S. Pat. No. 2,848,187, issued Aug. 19, 1958 to the assignee of the present application. While the ball bearing in the U.S. Pat. No. 3,848,187 patent prevents the rotation of the valve member once it is seated, rotation of the valve member once it is lifted off the seat is inherent in the disclosure.

BRIEF SUMMARY OF THE INVENTION

Applicant's invention is directed to a relief valve which includes a valve body having an inlet, an outlet, a passageway extending therebetween and a stationary annular valve seat forming a portion of the passageway. A valve member is slidably retained in the passageway and includes a sealing member which is capable of moving into and out of sealing engagement with the first valve seat as the valve member slides in the passageway. Also, an adjustable retainer positioned inside the passageway threadedly engages a portion of it and retains a spring positioned therebetween the retaining means and the valve member for biasing the sealing member against the valve seat. The improvement of applicant's invention comprises bearing means which are positioned between one end of the spring means and either the retaining means or the valve member. The bearing means has a lower coefficient of friction in rotation than the coefficient of friction between the sealing member and valve seat when they are engaged. The bearing means prevents the rotational force which is necessary to adjust the retaining means from extending through the sealing engagement between the sealing member and valve seat.

The invention is also directed to a relief valve as described above wherein the spring means includes a coil spring, and the bearing means includes a ball bearing.

It is therefore an object of the invention to provide in an adjustable relief valve a bearing means positioned between the valve adjusting means and the valve member to prevent the translation of moment forces between same when the valve adjustment means is rotated.

Another object of the invention is the provision of a spring biased adjustable relief valve of a ball bearing positioned between one end of the coil spring and one of the valve member and valve adjustment means for preventing the rotation of the valve member upon the valve seat when the valve adjustment means is rotated.

BRIEF DESCRIPTION OF THE DRAWINGS

The features of the present invention which are believed to be novel, are set forth with particularity in the appended claims. The invention, together with further objects and advantages thereof, may best be understood by reference to the following description taken in connection with the accompanying drawings, wherein like reference numerals identify like elements throughout and in which:

FIG. 1 is a side-elevational view of a relief valve which is partially cut away to show the bearing means constructed in accordance with the invention for preventing any moment upon the valve adjustment means from extending to the valve member.

FIG. 1A is an enlarged detail view of a portion of FIG. 1, including the bearing means.

FIG. 2 is a top plan view of the relief valve shown in FIG. 1.

FIG. 3 is an elevation view in section of a second embodiment of the invention wherein the bearing means is positioned on the side of the biasing spring opposite that of the first embodiment shown in FIG. 1.

FIG. 4 is an elevational section of a third embodiment of the invention wherein a hemispherical bearing means projecting from and integrally formed with the valve adjustment means provides the bearing surface for the relief valve of the invention.

DETAILED DESCRIPTION OF THE INVENTION

Referring to FIG. 1, a relief valve constructed in accordance with the invention is generally indicated at 10. Relief valve 10 is constructed to be mounted to the interior of a device or apparatus for which it is to control the maximum fluid pressure therein. In order to be adapted for interior mounting, relief valve 10 includes a valve body 11 which is generally cylindrical in shape having an outer threaded portion 12 adjacent one end of the valve body. The threaded portion includes a plurality of threads 13 positioned thereon. Valve body 11 also includes a hexagonal nut-like portion 14 at its other end which is adapted to receive a turning tool such as a wrench or the like for turning the threaded portion 12 into mating engagement with a threaded aperture (not shown) in the device or apparatus to which the relief valve is to be interiorly mounted. Hexagonal portion 14 includes six similarly shaped flat face surfaces 15 positioned end to end around the valve body to form three sets of parallel faces, as shown most clearly in FIG. 2. As shown in FIG. 1, the threaded portion 12 and the hexagonal portion 14 form substantially the entire outer portion of the valve body 11, except for a thin annular ring 16 positioned between them. It can be appreciated that if the length of valve body 10 is elongated, the cylindrical portion 16 may be extended to cover the added length.

The interior of valve body 11 is hollow and includes an annular inlet passageway 20 which extends inwardly of the center of valve body 11 from the bottom outer end surface 21 which is positioned immediately adjacent the hexagonal portion 14 of valve body 11. The hollow interior of valve body 11 also includes an outlet passageway, generally indicated at 22, which extends from the inward end of inlet passageway 20 axially through the remainder of valve body 11 to the upper outer surface 23 of the valve body. Outlet passageway 22, while being generally annular in shape, is a more complex surface than that of inlet passageway 20. Adjacent the inner end of inlet passageway 20, outlet passageway 22 begins with a flat annular valve seat surface 24. An annular indent groove 25 is positioned radially outwardly of valve seat surface 24. Radially outwardly of indent groove 25 is an annular elbow detent portion 26 which widens the dimensions of hollow inlet passageway 22. Immediately radially outwardly of detent elbow 26 is positioned an elongated hollow valve cylinder surface 30 which extends along outlet passageway 22 for a substantial portion of its length. Finally, an interiorly threaded portion 31, having a plurality of interior threads 32 therein, forms the remainder of valve outlet passageway 22 which ends at the top surface 23 of valve body 11.

Positioned in the interior of outlet passageway 22 are the valve member or piston, generally indicated at 33, which is slidably retained along the valve cylinder surface 30, a valve spring retainer 34 which threadedly engages the internal threads 32 at the upper end of outlet passageway 22; a coil spring 35 retained between the valve spring retainer 34 and valve piston 33; and the bearing means of the invention, generally indicated at 36. In this first embodiment, the bearing means 36 is positioned between the inner end of coil spring 35 and the interior of valve piston 33 and includes a portion of same.

Valve piston 33 includes a hollow cylindrical outer wall 40 open at one end 41 and has a disc-shaped head wall 42 at its other end. An annular detent wall 43 extends outwardly of the head end 42 of piston 33 to provide a mounting for fluorocarbon sealing member or disc 44 mounted therein. Valve sealing member 44 is mounted in valve piston 33 so as to be positioned against valve seat 24 in outlet passageway 22 to provide a sealing engagement with it. The annular detent wall 43 of valve piston 33 is positioned to fit in the annular groove 25 in outlet passageway 22, and the cylindrical wall 40 of valve piston 33 is of a diameter of sufficient size to be slidably retained in valve cylinder 30.

Valve spring retainer 34 is longer than it is wide, as shown most clearly in FIG. 2, and includes a plurality of discontinuous threads 45 at its ends which matingly engage the interior threads 32 in outlet passageway 22 to provide a stable mounting for the retainer in the valve body 11. The generally flat side surfaces 46—46 of the retainer 34 provide a means for turning it on interior threads 32 to move the retainer inwardly and outwardly of outlet passageway 22 and thereby set the tension on valve piston 33 through the coil spring 35 mounted therebetween. The spaces between retainer side surfaces 46—46 and the remainder of threads 32 provide a hollow area for fluid to pass through the outlet passageway 22 in this embodiment. An axially aligned hole 50 extends through valve spring retainer 34 to provide additional outlet passageway space. Also, an annular detent portion 51 on retainer 34 extends inwardly thereof forming a mounting for coil spring 35.

Coil spring 35 preferably includes flat ground end surfaces 35a which tend to more evenly spread the forces between the spring and members to which its ends are mounted, thereby providing for more stability in valve seating. In this embodiment, the bearing means 36 of the invention is positioned adjacent the lower end of coil spring 35 between the coil spring and valve piston 33 and includes a portion of same. Bearing means 36 of the invention is most clearly shown in FIG. 1A. A disc-shaped spring guide 52 is mounted to the lower end of coil spring 35. Spring guide 52 is circular in outline having an outer diameter approximating that of coil spring 35, and an inwardly extending detent portion 53 having a diameter smaller than the inner diameter of coil spring 35 for mounting therein while retaining same. The flat ground end of coil spring 35 mounts against the side of the greater diameter outer portion of spring guide 52. The lower surface of spring guide 52 is generally flat, but has a concavely formed bearing surface 54 axially positioned therein which is highly polished to provide a low coefficient of friction. A ball bearing 55 is mounted therein. A hole 56 having a smaller diameter than that of concave bearing surface 54 extends axially upwardly from the bearing surface through spring guide 52. Hole 56 provides the dual function of lowering the amount of bearing surface and allowing for the escape of any particles which may find their way between ball bearing 55 and bearing surface 54.

The interior surface 60 of the head end 42 on valve piston 33 also includes a concave bearing surface 61 in which the opposing side of ball bearing 55 is mounted. Likewise, a hole 62 having a smaller diameter than that of concave surface 61 extends through the head end 42 of valve piston 33. Hole 62 also lowers the amount of bearing surface and provides a means for movement of foreign particles from between bearing surfaces. Further, hole 62 provides a means of escape for any foreign particles or pressure buildup at the back end of fluorocarbon disc 44 which, as mounted, is in communication with hole 62.

In operation, the valve spring retainer 34 is rotated on interior threaded portion 31 of the valve body 11 and is moved axially along the outlet passageway 22, thus, depending upon the direction of rotation, increasing or decreasing the tension of valve spring 35. The amount of tension in valve spring 35 determines the initial leak pressure at which fluorocarbon disc 44 mounted in piston 33 will be moved off of annular valve seat 24. The opening of the valve allows the fluid in inlet passageway 20 to escape between valve member 33 and outlet passageway 22. Since ball bearing 61 has a lower coefficient of friction in rotation with either or both of spring guide 52 or valve piston 33 than fluorocarbon disc 44 has with annular valve seat 24, the spring guide 20 turns on ball bearing 55 and fluorocarbon disc 44 remains in stationary position relative annular valve seat 24 during adjustments of initial leak pressure for the valve 10. After the initial leak pressure is set, valve spring retainer 34 may be welded or otherwise secured to threads 32 in outlet passageway 22 to maintain the desired initial leak pressure.

Two additional embodiments of the relief valve of the invention are shown in FIGS. 3 and 4. Whereas the bearing means of the invention in the embodiment of FIG. 1 is positioned between the lower end of the coil spring 35 and valve piston 33, in the second embodiment in FIG. 3 and third embodiment in FIG. 4, the respective bearing means 36a and 36b are positioned between the upper end of coil spring 35 and spring retainers 34a and 34b, respectively. In the second embodiment shown in FIG. 3, spring guide 52 is mounted in the upper end of valve spring 35 and ball bearing 55 is mounted in the concave bearing surface 54 positioned therein. However, the downwardly extending detent portion 51 of spring retainer 34 has been removed in spring retainer 34a and a concave bearing surface 63 has been positioned axially therein to receive the opposing side of ball bearing 55. Hole 50 axially extends through valve spring retainer 34a to allow for the escape of foreign particulate matter between bearing surfaces and to reduce the overall amount of mating surfaces. The operation of the second embodiment shown in FIG. 3 is identical with that of the first embodiment shown in FIG. 1, with the exception that the rotation of valve spring 35 is stopped and all rotation takes place around the upper end of valve spring 35 rather than around the lower end of the valve spring as shown in the first embodiment in FIG. 1.

The structure and operation of the third embodiment of the relief valve of the invention shown in FIG. 4 is similar to that of the second embodiment shown in FIG. 3, with the exception that the ball bearing 55 has been eliminated and a hemispherical bearing surface 55b has been formed as a detent extending downwardly from the center of spring retainer 34b. Bearing surface 55b is mounted upon concave bearing surface 54 of spring guide 52 which is retained in the upper end of valve spring 35. The rotation of valve spring retainer 34b automatically rotates the integrally formed hemispherical bearing surface 55b thereon. The low coefficient of friction between bearing surface 55b and bearing surface 54 is lower than that between valve seat 24 and fluorocarbon disc 44 so that the sealing relation between the latter is not disturbed during adjustment of the initial leak pressure of the valve.

While particular embodiments of the invention have been shown and described, it will be obvious to those skilled in the art that changes may be made without departing from the invention in its broader aspects. Therefore, the aim of the appended claims is to cover all such changes and modification as fall within the true spirit and scope of the invention.

I claim:

1. In a relief valve for a refrigeration system including
   a valve body having an inlet, an outlet, and a passageway extending therebetween;
   a stationary annular valve seat forming a portion of said passageway;
   a valve member slidably retained in said passageway including a surface thereon which is adapted for moving into and out of sealing engagement with said valve seat as said valve member slides in said passageway;
   adjustable retaining means which threadedly engage a portion of said passageway, and
   spring biasing means including a coil spring and a disc-shape spring guide mounted on one end of said spring positioned in said passageway between said adjustable retaining means and said slidable valve member for biasing said sealing surface against said valve seat, the improvement comprising:
   bearing means including a ball bearing, substantially concave bearing surfaces axially aligned on said retaining means and said spring guide into which said ball bearing is positioned, and holes through said retaining means and said spring guide in communication with said concave bearing surfaces thereon for providing a means of escape for particulate matter finding its way between said bearing surfaces and said ball bearing; and
   said bearing means having a lower coefficient of friction than that between said sealing surface and said valve seat when engaged for preventing the rotational force necessary to adjust said retaining means from extending to said sealing engagement between said valve seat and said sealing surface.

2. In a relief valve for a refrigeration system including
   a valve body having an inlet, an outlet, and a passageway extending therebetween;
   a stationary annular valve seat forming a portion of said passageway;
   a valve member slidably retained in said passageway and having a fluorocarbon insert positioned thereon which is adapted for moving into and out of sealing engagement with said valve seat as said valve member slides in said passageway;
   adjustable retaining means which threadedly engage a portion of said passageway, and
   spring biasing means including a coil spring and a disc-shape spring guide mounted on one end of said spring, positioned in said passageway between said adjustable retaining means and said slidable valve member for biasing said fluorocarbon insert thereon against said valve seat, the improvement comprising:
   bearing means including a ball bearing, substantially concave bearing surfaces axially aligned on said spring guide and said valve member into which said ball bearing is positioned, and holes through said spring guide and said valve member and in communication with said concave bearing surfaces thereon for providing a means of escape for particulate matter finding its way between said bearing surfaces and said ball bearing; and said bearing means having a lower coefficient of friction than that between said sealing surface and said valve seat when engaged for preventing the rotational force necessary to adjust said retaining means from extending to said sealing engagement between said valve seat and said sealing surface.

* * * * *

UNITED STATES PATENT AND TRADEMARK OFFICE
CERTIFICATE OF CORRECTION

PATENT NO. : 4,049,017
DATED : September 20, 1977
INVENTOR(S) : Evan Jones

It is certified that error appears in the above-identified patent and that said Letters Patent are hereby corrected as shown below:

Column 1, line 34, please insert --have-- before the word "included".

Column 1, line 51, "is" should be --in--.

Signed and Sealed this

Second Day of May 1978

[SEAL]

Attest:

RUTH C. MASON
Attesting Officer

LUTRELLE F. PARKER
Acting Commissioner of Patents and Trademarks